US012450061B2

(12) United States Patent
Shomali et al.

(10) Patent No.: US 12,450,061 B2
(45) Date of Patent: Oct. 21, 2025

(54) EXTENSIBLE EVENT BUS ARCHITECTURE

(71) Applicant: Better Holdco, Inc., New York, NY (US)

(72) Inventors: Raed Shomali, West Orange, NJ (US); Benjamin Nicholes, Wake Forest, NC (US)

(73) Assignee: Better Holdco, Inc., New York, NY (US)

( * ) Notice: Subject to any disclaimer, the term of this patent is extended or adjusted under 35 U.S.C. 154(b) by 0 days.

(21) Appl. No.: 18/483,304

(22) Filed: Oct. 9, 2023

(65) Prior Publication Data

US 2024/0329989 A1   Oct. 3, 2024

Related U.S. Application Data

(63) Continuation of application No. 17/590,302, filed on Feb. 1, 2022, now Pat. No. 11,782,712.

(51) Int. Cl.
*G06F 9/54* (2006.01)
*G06F 9/30* (2018.01)

(52) U.S. Cl.
CPC .......... *G06F 9/30072* (2013.01); *G06F 9/542* (2013.01)

(58) Field of Classification Search
CPC ............................ G06F 9/542; G06F 16/1734
See application file for complete search history.

*Primary Examiner* — Andy Ho (57) ABSTRACT

Systems and methods are provided for generating an event type and extending event message streaming. The generating an event type includes receiving event definition data. The disclosed technology includes an event type generator that generates scripts in a variety of languages for processing an event of the event type and event dictionary data including event schema associated with the event type. The event dictionary data represents a lightweight library package for merging into a micro service. The event type generator further registers the event type in an event message streamer thereby extending the event message streaming with the event type. The event message streamer provides an event bus that receives an event of the registered event type from a micro service for publishing. The event message streamer delivers the event in an event message to one or more micro services that subscribes to the event type for consuming.

20 Claims, 9 Drawing Sheets

FIG. 1

```
Folder Structure:

Data/ 202
    hello.world.1.json 204
    account/ 206
        login/ 208
            account.login.1.json 210
            account.login.2.json 212
        create/ 214
            account.create.1.json 216
```

FIG. 2A

```
{
  "topic": {
    "subject": "account",
    "verb": "login",
    "version": 1
  },
  "metadata": {
    "owner": "Auth Team",
    "description": "An event that captures user logins",
    "examples": [
      {
        "accountId": 1,
        "roles": ["ADMIN"],
        "loggedInAt": "2021-11-13T20:20:39+00:00"
      }
    ]
  },
  "config": {
    "partitions_count": 10,
    "replication_factor": 3,
    "retention_milliseconds": 604800000,
    ...
  },
  "schema": {
    "type": "object",
    "properties": {
      "accountId": {
        "type": "number"
      },
      "roles": {
        "type": "array",
        "items": {
          "type": "string"
        }
      },
      "loggedInAt": {
        "type": "string",
        "format": "date-time"
      }
    },
    "required": ["accountId", "roles", "loggedInAt"]
  }
}
```

```
function publish(topic, message){
  var schema = this.schemas.get(topic)
  if (!schema) {
    throw Exception("Unknown topic " + topic)
  }
  err = jsonSchemaMessageValidator(schema, message)
  if (err) {
    throw Exception("Invalid message " + err.message)
  }
  var envelope = putInEnvelope(message)
  this.eventStreamer.publish(topic, envelope)
} function consume(topic) ([]message) {
  var schema = this.schemas.get(topic)
  if (!schema) {
    throw Exception("Unknown topic " + topic)
  }
  var envelopes = this.eventStreamer.consume(topic, this.options)
  var messages = extractMessages(envelopes)
  err = jsonSchemaMessagesValidator(schema, messages)
  if (err) {
    throw Exception("Invalid message " + err.message)
  }
  return messages
}
```

FIG. 4A

```
import { topics, types, schemas } from 'event-bus-definitions'
// This is a versioned definition library ...

var eventBusClient = new EventBusClient(schemas, types)
eventBusClient.publish(topics.Account_Login_1, {
  "accountId": 123456,
  "roles": ["ADMIN"],
  "loggedInAt": now()
})
```

EXTENSIBLE EVENT BUS ARCHITECTURE

BACKGROUND

Use of event-driven mechanisms has been commonplace in synchronizing execution of instruction codes (e.g., applications) that otherwise execute asynchronously in a system. Some instruction codes transmit a message (e.g., an event) to other instruction codes, causing the other instruction codes to receive the event and execute in response to the received event. Some message streaming system provides a pipeline to stream events and messages across instruction codes. Instruction codes subscribe to an event type and receive (e.g., consume) an event of the event type when some instruction code triggers (e.g., publishes) the event in the message streaming system. As the message streaming system provides as an intermediary (e.g., a pipeline) in delivering the event among instruction codes, no direct communication arises between the instruction code that publishes the event and one or more instruction codes that consume the event.

Issues arise when the system adds and/or updates definitions of the events for use by the instruction codes. The respective instruction codes need revisions based on a new or updated event schema including a data structure and valid parameter values. A code developer who defines data structures and semantics of events informs the event schema to other developers who generate instruction codes to incorporate the event schema into the instruction codes. While enhancing types of events enriches indirect interactions among asynchronously executing instruction codes, a process of development becomes time-consuming and prone to errors. Thus, developing a technology that better meets these needs while minimizing trade-offs would be desirable.

It is with respect to these and other general considerations that the aspects disclosed herein have been made. In addition, although relatively specific problems may be discussed, it should be understood that the examples should not be limited to solving the specific problems identified in the background or elsewhere in this disclosure.

SUMMARY

According to the present disclosure, the above and other issues are resolved by an event type register, which receives event definition data for an event type and automatically generates a combination of event schema and scripts in one or more programming languages. The event type register further registers the event type in an event message streamer. Respective instruction codes (e.g., micro services) pull a script library, merge event schema into the instruction codes. The instruction codes subscribe to the event type by connecting to an event message streamer. The script library is lightweight because the scripts receive event dictionary data as input, rather than depending on event data schema. Use of the lightweight script library with event schema simplifies a process of revising respective instruction codes to enable the instruction codes to process events of the event type. The event type register further automates registering and maintaining event types in event master data in an event message streamer. The present disclosure reduces and/or eliminates the complexity and time-consuming process of revising instruction codes and updating the event message streamer by automatically generating scripts, event dictionary with event data schema based on event definition data.

The present disclosure further includes a computer-implemented method for extending event streaming for a topic. The method comprises receiving event definition data associated with the topic; generating, based on the event definition data, one or more of a data type, a schema, or a script; generating a set of package data associated with a plurality of script languages; storing the set of package data in a library repository for publication; and registering, based on the event definition data, the topic and a configuration in an event message streamer. The set of package data includes a package data associated with each script language. The method generates the one or more of a data type, the schema, or the script based on the event definition data. The script includes at least one of connecting, publishing, consuming, or validating the event type. The plurality of script languages comprises Python and TypeScript. The event definition data comprises JavaScript Object Notation. The event message streamer includes an event bus.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

DETAILED DESCRIPTION

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

Developing and updating application programs and/or instruction codes becomes complex and time-consuming when the event-driven instruction codes are developed concurrently in a distributed development environment. In particular, the instruction codes that executes asynchronously uses events and/or messages to synchronize with other instruction codes. The tasks for developing and updating instruction codes may include more than a careful planning of data schema for an event type. The tasks further include editing multiple files with instruction codes, updating versions of event schema specifications, and synchronizing the instruction codes, which use various distinct types of script languages. The task yet further includes creating scripts for pulling and merging library packages, merging commits, synchronizing a version of event schema with an event message streamer, verifying builds status, verifying versions of a code repository, and updating their respective clients' versions. After successfully completing the steps, the instruction code may import the latest clients' version of the library package. After importing the latest version, the instruction codes may interact with one another through transmitting and receiving events of the new event type through an event bus (e.g., an event message streamer). Additionally or alternatively, different applications may use programming and/or script languages that are distinct from one another (e.g., Python, TypeScript, and the like).

The disclosed technology addresses the issue of the complexity and prolonged development time by automating and optimizing code generation for adding a new event. Rather than creating and maintaining a set of distinct instruction codes for accommodating a new event type, the disclosed technology enables the developers create event definition data (e.g., in a JSON file) that describes event data schema. The event definition data may include a description of an event type, configurations of the event type (e.g., partitions for the event message streamer to implement event messages for the event type), and event schema. By generating event dictionary data associated with an event type, the disclosed technology alleviates the needs to create a large wrapper program and/or a database to manage data schema for distinct event types.

The present disclosure automatically generates an event script library for an event type. The event script library includes instruction codes written in one or more distinct programming languages (e.g., Python, TypeScript, and the like). A topic register registers the event (e.g., a new topic) to an event message streamer. Instruction codes may use the exported script library for subscribing to the event type in the event message streamer. The instruction codes may generate an event by publishing the event to the event message streamer. Other instruction codes that subscribe to the event type may respectively receive the event as a message from the event message streamer.

Figure 1:
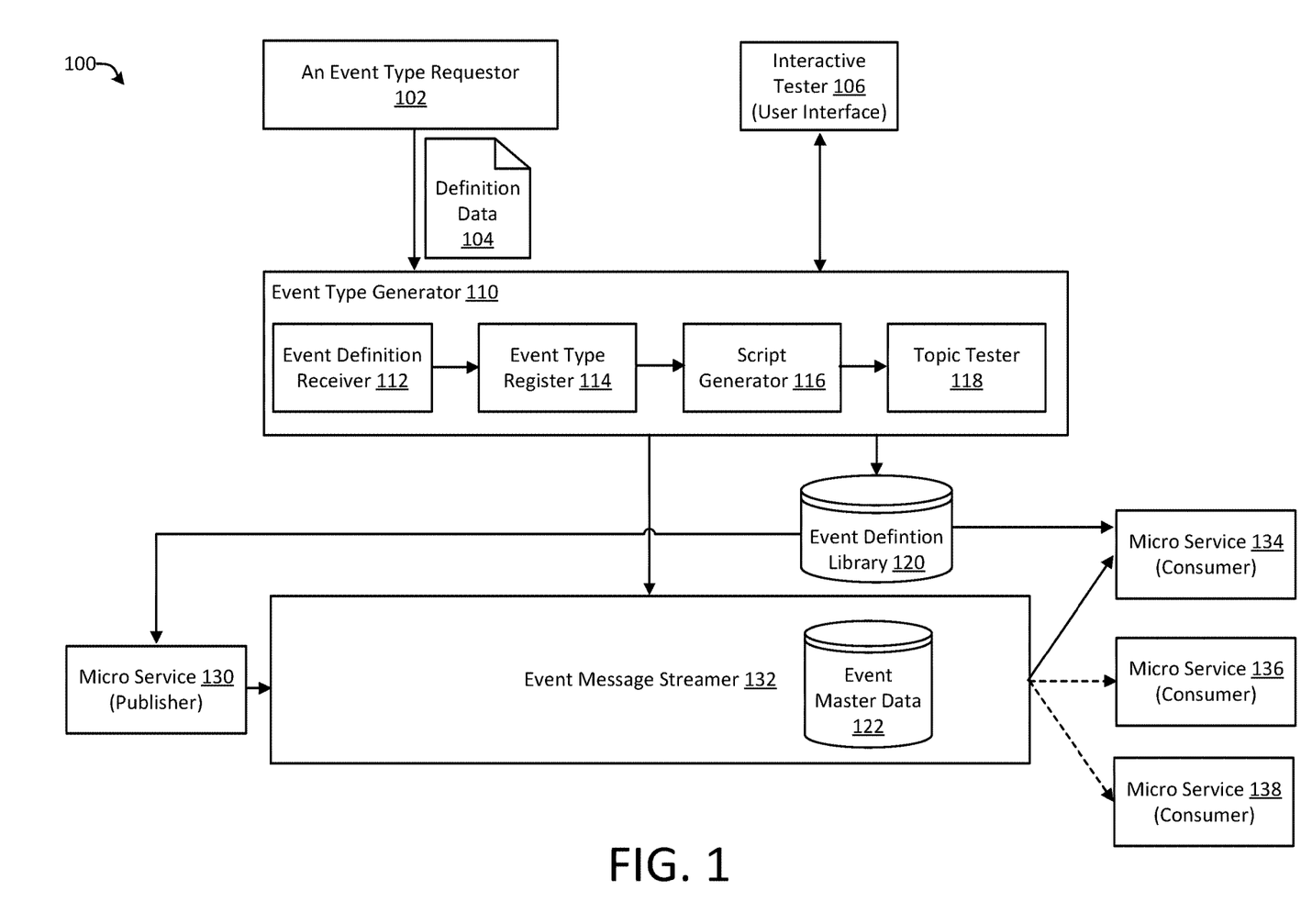
FIG. 1 illustrates an overview of an example system for registering an event type in accordance to aspects of the present disclosure.

FIG. 1 illustrates an overview of an example system for registering an event type in accordance to aspects of the present disclosure. System 100 may represent a system for registering an event type and generating a script library associated with the event type based on definition data.

The system 100 includes an event type requestor 102 (a client device), definition data 104, an interactive tester 106 (user interface), an event type generator 110, an event definitions library 120 (e.g., a script library), micro service 130 (Publisher), an event message streamer 132, and micro services (134, 136, and 138) (Consumers). In aspects, the event type generator 110 receives definition data 104 associated with an event type from the event type requestor 102. The definition data 104 includes a definition of one or more event types (e.g., topics) being requested to register. In aspects, the definition data may specify a new event type for creating and/or an existing event type for revision.

The event type requestor 102 may be a client device where a developer of applications or instruction codes uses for requesting the event type generator 110 to register a new or a revised event type. In aspects, the event type requestor 102 may provide graphical user interface to create and submit the definition data 104. In some other aspects, the developer may use the event type requestor 102 to upload the definition data 104, triggering the event type generator 110 to receive the definition data 104.

The definition data 104 includes a definition of at least an event type. In aspects, the definition data 104 includes information necessary to define and manage an event type. For example, the definition data 104 may include a name and descriptions of an event type, a version identifier, a subject of the event type (e.g., account), a verb or action (e.g., "login"), configuration data associated with delivering an event of the event type, an event scheme that includes one or more properties as objects of the event type. In aspects, the definition data 104 may be expressed in a script notation (e.g., XML—extensible markup language, JSON—JavaScript Object Notation, and the like).

The event type generator 110, based on the definition data 104, registers an event type (e.g., a topic) in the event message streamer 132 and generates an event definitions library 120. In aspects, the event type generator 110 may include an event definition receiver 112, an event type register 114, a script generator 116 (e.g., an event definition generator), and a topic tester 118.

The event definition receiver 112 receives definition data 104 from the event type requestor 102. In aspects, the event definition receiver 112 may parse the definition data 104 and identify event schema, parameter values needed to register an event type (e.g., a topic) in the event message streamer 132. In some aspects, the event definition receiver 112 may identify in the definition data 104 a description and an example of using the event type for generating a document (e.g., a specification) associated with the event type.

The event type register 114 registers the identified event type (e.g., a topic) in the event message streamer 132. In aspects, the event type register 114 may transmit parameter values needed for registering the event type. For example, the parameter values may include values representing a subject, a verb (e.g., an action), configuration settings of the event type, and a version identifier of the event schema. In some aspects, a pull request may merge the event type into event master data 122 in the event message streamer 132.

The script generator 116 generates scripts (e.g., event definitions) associated with the event type. In aspects, the script generator 116 automatically generates the scripts (e.g., instruction codes that describe event definitions) in one or more distinct programming languages. Examples of the programming language may include but not limited to Python and Type Script. The scripts include various commands and/or functions (e.g., connect, publish, consume, validate, and the like) used by respective micro services (e.g., an application) for triggering (e.g., publishing) and receiving (e.g., consuming) events of the event type. Additionally or alternatively, the script generator 116 generates dictionary data for exporting to the respective micro services. In aspects, the dictionary data include event schema for the event type. The data schema may include a name of the event schema, a type of the event, and properties and valid data types of values. The respective micro services may merge a lightweight package that includes the dictionary data in respective instruction codes. In aspects, the script generator 116 stores the scripts in the event definitions library 120.

The event definitions library 120 stores the script and the export dictionary data. In aspects, the script library includes a hierarchical data structure in storing data (e.g., folders and files). For example, there may be folders that correspond to respective event types (e.g., topics). Each folder of an event type may include one or more subfolders, each corresponding to a programming language used in respective scripts. The respective micro services (130, 134, 136, and 138) access the event definitions library 120, pull a combination of the scripts and the export library, and merge the scripts into instruction codes for enabling use of the event type.

The topic tester 118 receives a request for testing and validating the registered event type. In aspects, the topic tester 118 communicates with the interactive tester 106 that provides a user interface for interactively testing events of the event type. For example, the interactive tester 106 displays names of attributes associated with the event type. The interactive tester 106 receives values that correspond to the respective attributes, and transmits the values to the topic tester 118. The topic tester 118 publishes an event of the event type through the event message streamer 132 and receives a result of publishing the event. Additionally or alternatively, the topic tester 118 automatically validates the received values associated with the event type based on event data schema in the event dictionary data in the event definitions library 120. The topic tester 118 transmits the result to the interactive tester 106 for displaying the result of testing and/or validating.

The micro service 130 (publisher) represents an exemplary micro service that published an event of the event type. In aspects, the micro service 130 includes instruction codes that receive the scripts and the export dictionary associated with the event type from the event definitions library 120. The micro service 130 may publish an event of the event type through the event message streamer 132. The event message streamer 132 provides a pipeline to receive, queue, and deliver the event as a message to other micro services (e.g., the micro services (134, 136, and 138)). The other micro services may consume (e.g., receive) the event by subscribing to the event type at the event message streamer 132.

The event message streamer 132 may receive and deliver one or more events associated with event types. In aspects, the event message streamer 132 may include an event bus and/or a pipeline for delivering events between micro services. The event message streamer 132 may include event master data 122. The event master data 122 includes data associated with registered event types.

Micro service 134 (consumer) subscribes to the event type at the event message streamer 132. The micro service 134 (consumer) consumes an event when the event message streamer 132 receives the event for publishing from the micro service 130 (publisher). In aspects, the event message streamer 132 delivers events of an event type to micro services that subscribe to the event type. In some aspects, those micro services that do not subscribe to the event type (e.g., the micro service 136 and the micro service 138) do not receive the event.

As should be appreciated, the various methods, devices, applications, features, etc., described with respect to FIG. 1 are not intended to limit the system 100 to being performed by the particular applications and features described. Accordingly, additional controller configurations may be used to practice the methods and systems herein and/or features and applications described may be excluded without departing from the methods and systems disclosed herein.

Figure 2A:
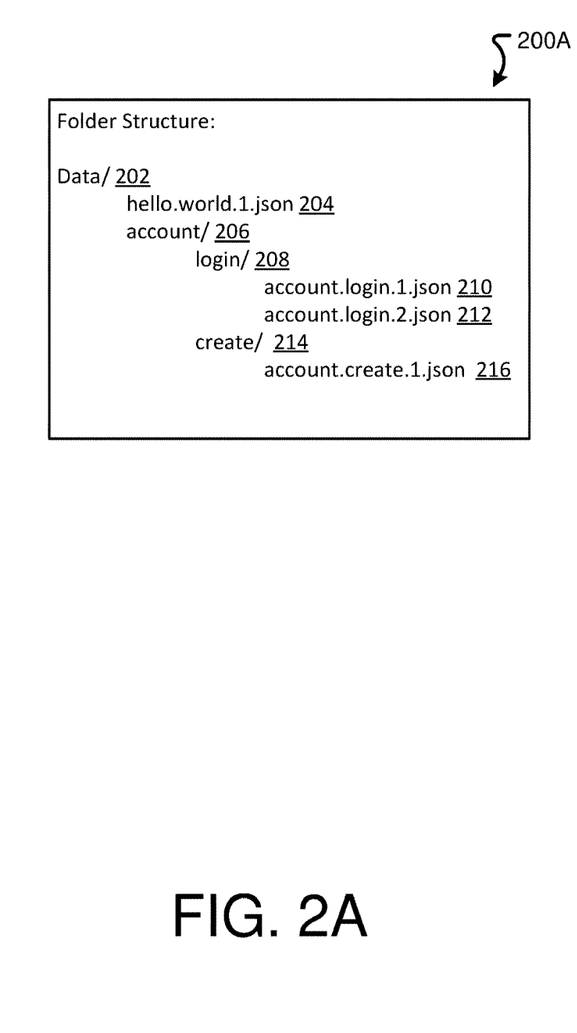
FIGS. 2A-B illustrate examples of data structures in accordance with aspects of the present disclosure.

FIG. 2A illustrates an exemplary data structure for storing event definition data in accordance with aspects of the present disclosure. The data structure 200A includes a hierarchical structure for storing data (e.g., files) in folders. For example, a data folder 202 includes event definition data file "hello.world.1.json" 204 written in JSON. The data folder 202 further includes an account folder 206, which stores data files needed to process an account. The account folder 206 stores event definitions files for with event types for the account. The login folder 208 includes "account.login.1.json" 210 and "account.login.2.json" 212. The two JSON files both correspond to the same event type of login operation in different versions one and two respectively. A create 214 folder includes "account.create.1.json" event definition data file 216. Although FIG. 2A is described with respect to specific data and file types, one of skill in the art will appreciate that other types of data or files may be employed with the aspects disclosed herein.

In aspects, a developer of micro services creates the event definition data (e.g., the definition data 104 as shown in FIG. 1 and storing the event definition data in the data folders. The event definition receiver 112 may access the structured data storage and read the definition data 104. The example as detailed above does not limit a scope of the present disclosure. Other product specifications may be used in other contexts.

The example as detailed above does not limit a scope of the present disclosure. Other examples of auxiliary system supporting the determiner may include controllers of physical memory and processing resources in a virtual computer, a scheduler of processes, and allocators of physical and/or virtual memory and processing resources.

Figure 2B:
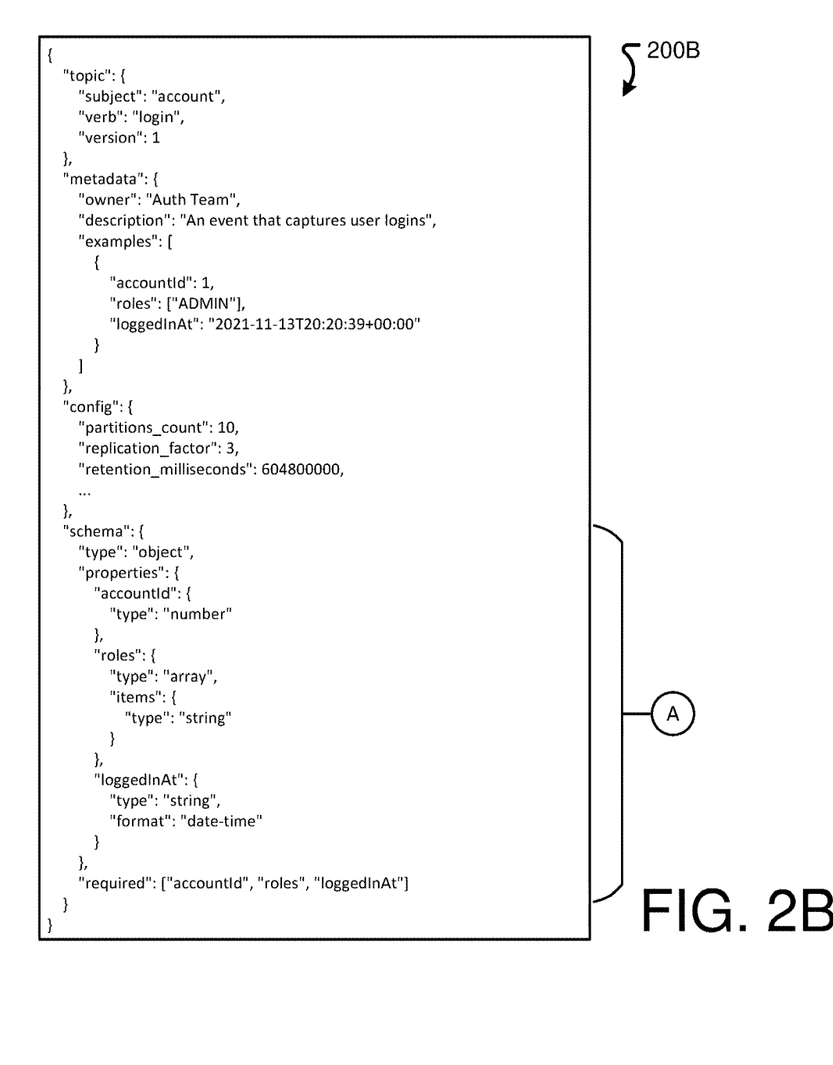

FIG. 2B is an exemplary data structure of event definition data in accordance with aspects of the present disclosure. The event definition data 200B includes a definition of an event type. For example, the event definition data 200B includes attributes and values (e.g., a subject, a verb, a version, configurations, and the like) for registering the event type in the event message streamer (e.g., the event message streamer 132 as shown in FIG. 1).

The "topic" structure includes "subject," "verb," and "version" fields which make up the underlying Event Streamer topic in the format of {subject}.{verb}.version-{version}. Accordingly, the exemplary Event Streamer topic is "account."

The "metadata" structure includes "owner," "description," and "examples" fields which serve as general information about the topic. These fields help others learn about the purpose of the event type and topic, who is responsible for maintaining them and examples of events in this topic. This information is also displayed in the Event Bus UI (The Web App) to make it easier for users to discover and learn about the available events.

The "config" structure includes several configuration fields that configure the Event Streamer's topic. For example, a partition count is ten. A replication factor is three. A retention millisecond has a value "604800000."

The "schema" structure validates the structure of the events being published to/consumed from the topic. In aspects, the "schema" structure includes a type (e.g., "object"), properties, and a required set of properties. The properties may include one or more properties and respective types and format as detailed below.

In aspects, the event definition data 200B includes data schema (as shown in a bracket marked as 'A' for the event type. For example, the data schema may include a type of data in an event under the event type (e.g., object), properties associated with the data schema (e.g., account ID, roles of the account that logged in, a timestamp of the login event, and the like). Additionally or alternatively, the data schema may include an indicator that indicates whether one or more attribute values is a part of the event. In aspects, an event definition receiver (e.g., the event definition receiver 112 as shown in FIG. 1) receives the event definition data 200B (e.g., the definition data 104 as shown in FIG. 1).

As will be appreciated, the various methods, devices, applications, features, etc., described with respect to FIGS. 2A-B are not intended to limit use of the data structure 200A and the event definition data 200B. Accordingly, additional and/or alternative processes and configurations may be used to practice the methods and systems herein and/or features and applications described may be excluded without departing from the methods and systems disclosed herein.

Figure 3A:
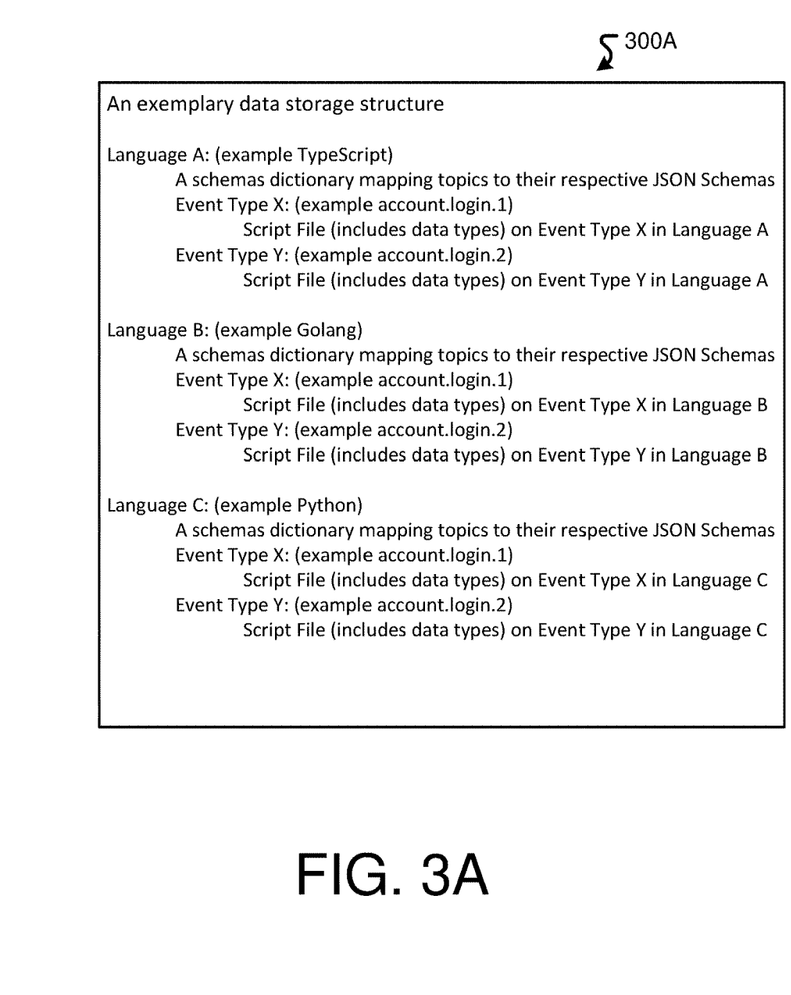
FIGS. 3A-B illustrate examples of data storage structure and event dictionary data in accordance with aspects of the present disclosure.

FIG. 3A is an exemplary data structure for storing scripts in accordance with aspects of the present disclosure. In aspects, at least a part of the script library (e.g., the event definitions library 120 as shown in FIG. 1) may include the data structure for storing scripts. The data storage structure may include folders. In aspects, each folder corresponds to a language (e.g., TypeScript, Golang, Python, and the like). Each folder includes one or more subfolders, each subfolder corresponding to an event type (e.g., account.login.1, account.login.2, and the like). Each subfolder includes one or more script files in respective script languages. Each script file includes one or more scripts. Examples of the one or more scripts may include but not limited to Connect to an event messaging streamer, Publish an event of the event type, Consume the event of the event type, and Validate the event based on event data schema.

Figure 3B:
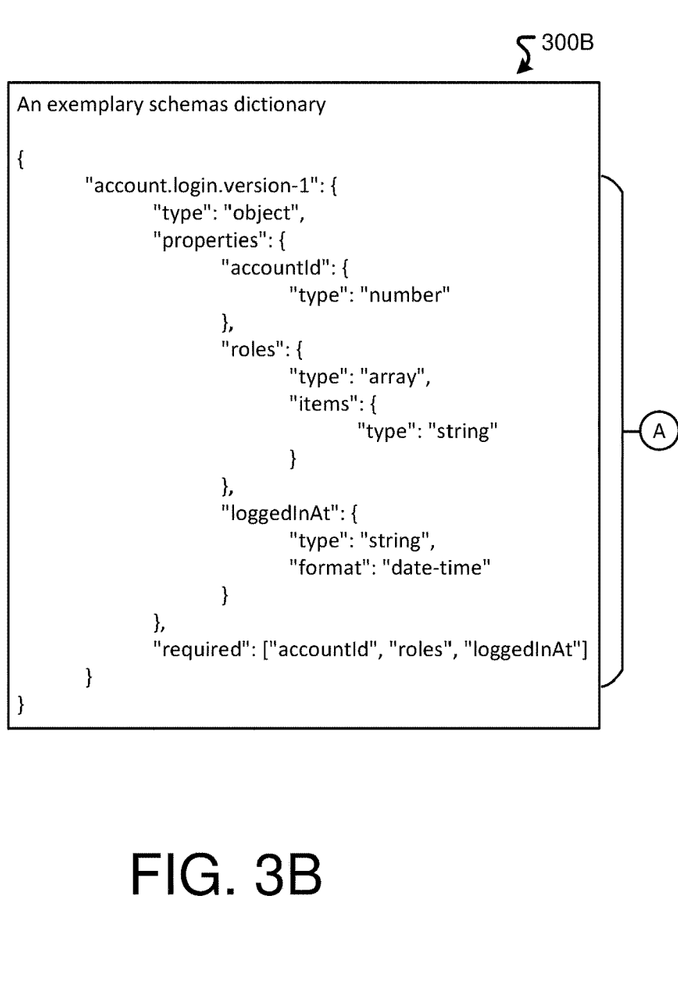

FIG. 3B is an exemplary data structure of dictionary data in accordance with aspects of the present disclosure. A schemas dictionary 300B includes a set of definitions of data types in an event associated with the event type as dictionary data. In aspects, the schemas dictionary 300B represents at least a part of the lightweight package, which the respective micro services use for publishing and consuming events of the event type.

For example, the schemas dictionary 300B represents definition data associated with an account login as an event type. An attribute "account.login.version-1" may represent a description where the dictionary data corresponds to a version one of the event type for account login. The event type includes an object as its type. For example, the data schema may include a type of data in an event under the event type (e.g., object), properties associated with the data schema (e.g., account ID, roles of the account that logged in, a timestamp of the login event, and the like). Additionally or alternatively, the data schema may include an indicator that indicates whether one or more attribute values is a part of the event. Additionally or alternatively, the event type may include properties with respective values. In aspects, the schemas dictionary 300B may be based at least on the definition data for the event type. For example, the definition of the account login event type may correspond to a part of the definition data (e.g., the data schema as shown in a bracket marked as 'A' also shown in FIG. 2B).

As should be appreciated, the various methods, devices, applications, features, etc., described with respect to FIGS. 3A-B are not intended to limit the data structures 300A-B to being performed by the particular applications and features described. Accordingly, additional controller configurations may be used to practice the methods and systems herein and/or features and applications described may be excluded without departing from the methods and systems disclosed herein.

Figures 4A, 4B:
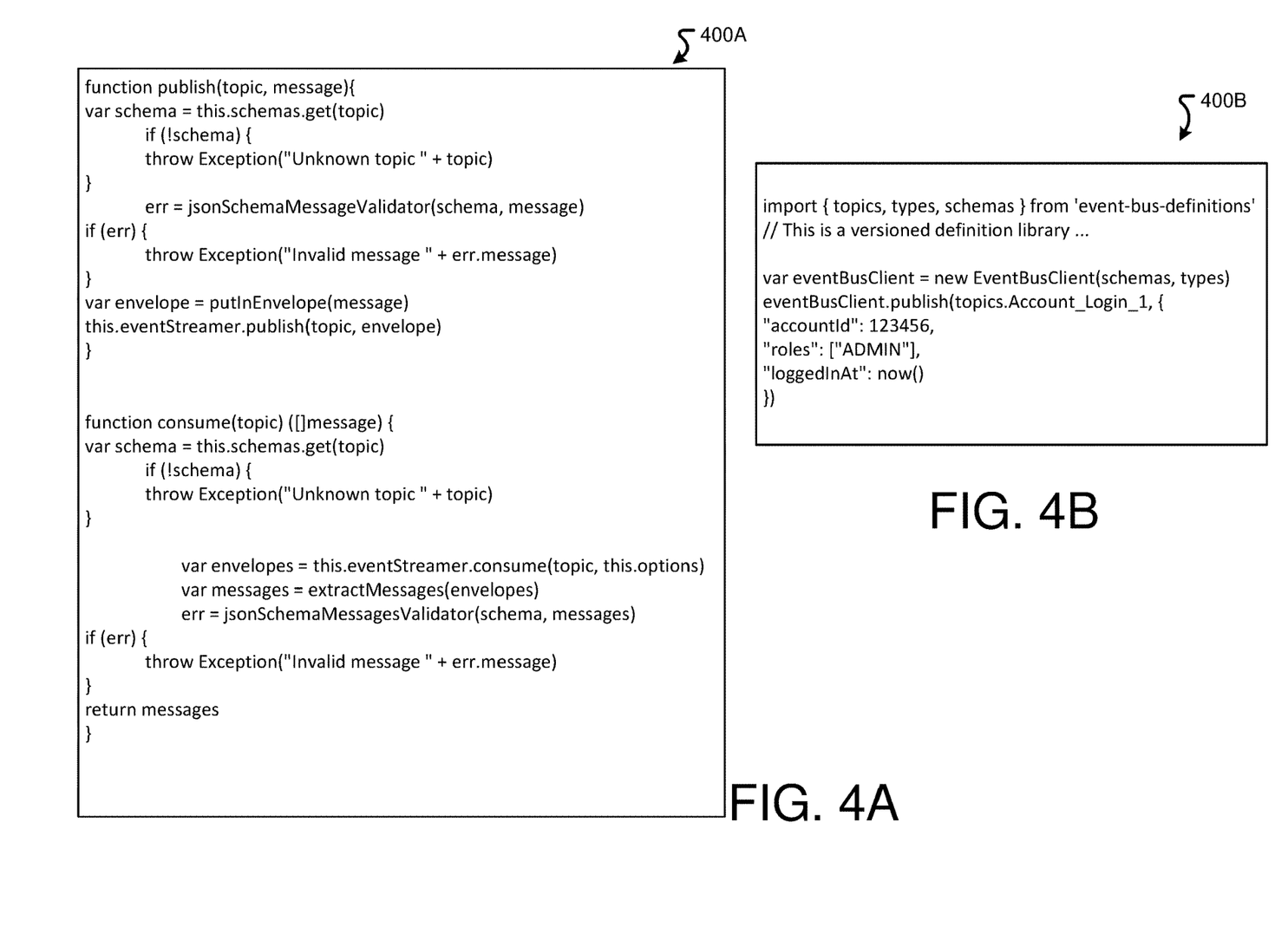
FIGS. 4A-B illustrate examples of scripts in accordance with aspects of the present disclosure.

FIG. 4A is an exemplary script in accordance with aspects of the present disclosure. In particular, the exemplary script 400A represents pseudocode that includes methods for publishing an event of an event type and consuming an event. In aspects, the publish method would accept the "topic" (e.g., an event type) as a parameter and use that to locate the respective JSON schema in order to validate an event message. If the topic is not found or the method fails validation, an exception is thrown. Otherwise, the event message streamer may publish the event (e.g., the message) onto the topic. The consume method would receive an event that has been published. In aspects, the pseudocode may further include steps that are language-specific and/or implementation-specific.

In aspects, the script library (e.g., the event definitions library 120 as shown in FIG. 1) includes the exemplary script. Additionally or alternatively, the script may include descriptions of the event type, a connect function for connecting to the event message streamer, a consume function for consuming an event, a validate function for validating the event, and the like.

In aspects, the disclosed technology removes the need for the respective micro services that use the event type to change or update its instruction codes when data schema for the event type changes. Rather, a developer of the micro services updates the event definition data based on the lightweight package and use the latest version of the event definitions.

FIG. 4B is an exemplary script in accordance with aspects of the present disclosure. In particular, FIG. 4B includes a script 400B. The script 400B includes a constructor and a publish function. The constructor accepts event definitions as input and creates an instance of a client application. Unlike some traditional systems where constructors depend on event definition packages, the present disclosure uses the constructor that accepts the event definitions that includes one or more versions with corresponding data schema. For example, the constructor automatically imports definitions of the event type. The new instance of eventBusClient publishes an event "topics.Account_Login_1" that includes an account ID of "123456" under a role "ADMIN" at a current timestamp value.

As should be appreciated, the various methods, devices, applications, features, etc., described with respect to FIGS. 4A-B are not intended to limit the scripts 400A-B to being performed by the particular applications and features described. Accordingly, additional controller configurations may be used to practice the methods and systems herein and/or features and applications described may be excluded without departing from the methods and systems disclosed herein.

Figure 5A:
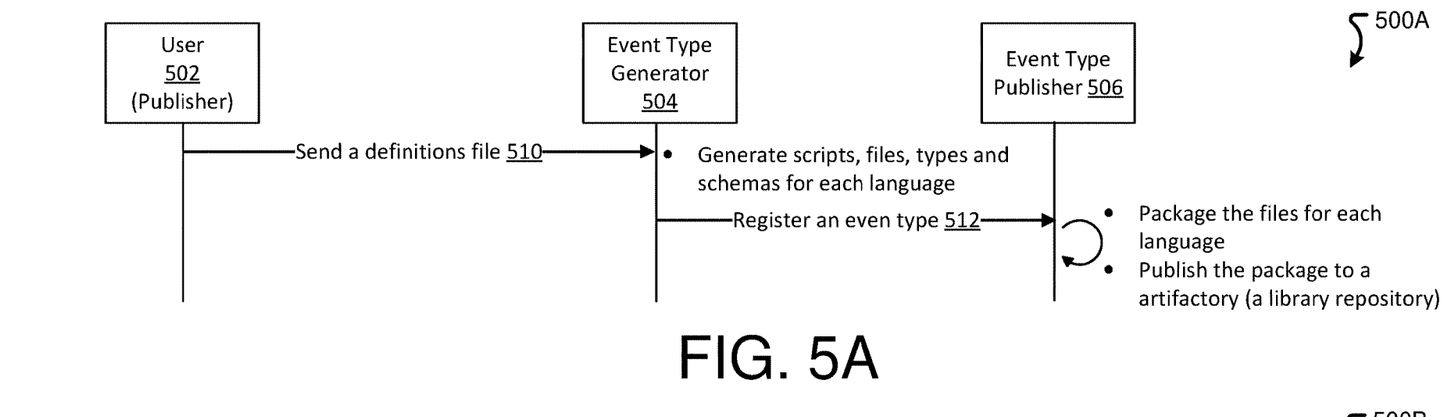
FIGS. 5A and 5B illustrate examples of a timing chart for registering and using an event in accordance with aspects of the present disclosure.
Figure 5B:
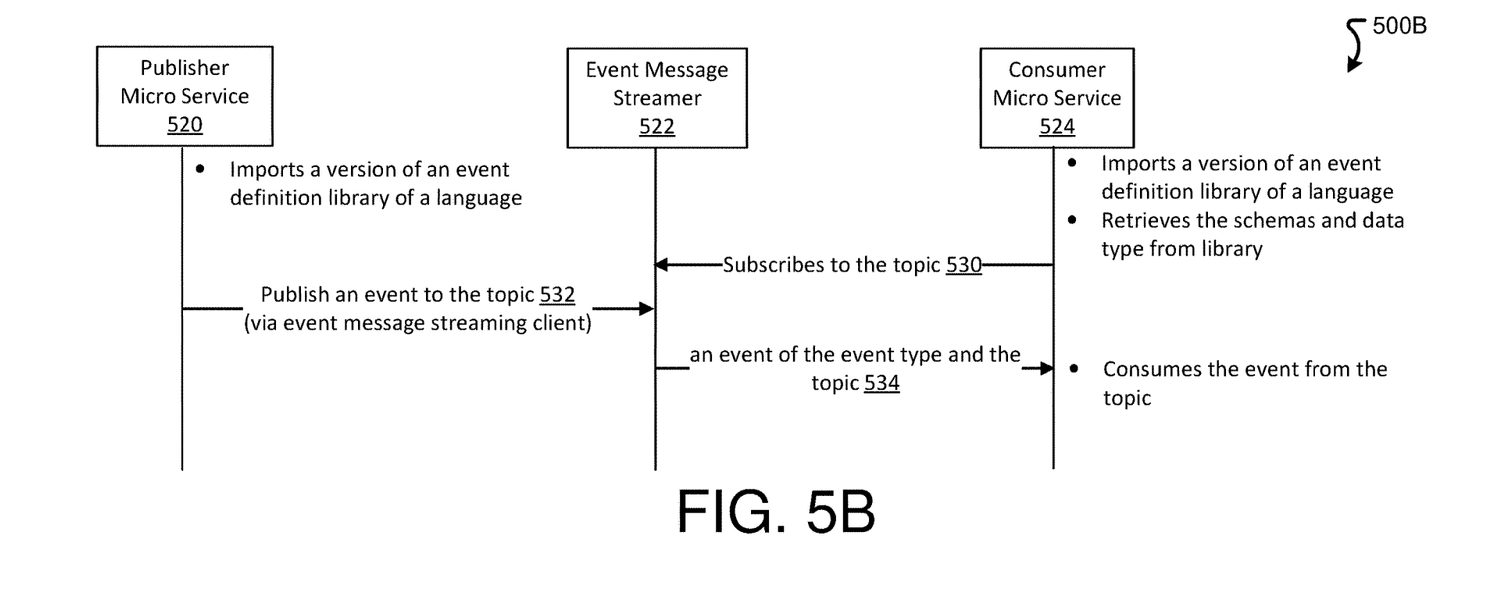

FIGS. 5A and 5B are timing charts associated with event messages in accordance with aspects of the present disclosure. FIG. 5A is a timing chart of registering a new event. The timing chart 500A includes a user 502, an event type generator 504, and an event type publisher 506. The timing chart 500A may include more or fewer steps or may arrange the order of the steps differently than those shown in FIG.

5A. The timing chart 500A can be executed as a set of computer-executable instructions executed by a computer system and encoded or stored on a computer readable medium. Further, processing according to the timing chart 500A can be performed by gates or circuits associated with a processor, an ASIC, an FPGA, a SOC or other hardware device. Hereinafter, the timing chart 500A shall be explained with reference to the systems, component, devices, modules, software, data structures, data characteristic representations, signaling diagrams, methods, etc. described in conjunction with FIGS. 1, 2A-B, 3A-B, 4A-B, 5B, 6, 7, 8, and 9.

Generally, the timing chart 500A starts with the user 502 sending 510 (e.g., submitting) a new event definitions file (e.g., the definition data 104 as shown in FIG. 1). The new event definitions file includes data associated with the new event and a topic. The user 502 sends 510 the definition file to the event type generator 504. In aspects, the user 502 may include a developer of a micro service. Additionally or alternatively to the send operation 510, the disclosed technology may provide a graphical user interface to the developer to interactively generate the definition file and send to the event type generator 504.

The event type generator 504 parses the definitions file and generates scripts, files, types, and schemas for each language. The event type generator 504 registers (512) an event type associated with the definition file by communicating with the event type publisher 506. The event type generator 504 packages the files for each language and publishes the package to an artifactory (e.g., a library repository).

As should be appreciated, operations 510-512 are described for purposes of illustrating timing of the present method and systems and are not intended to limit the disclosure to a particular sequence of steps, e.g., steps may be performed in different order, additional steps may be performed, and disclosed steps may be excluded without departing from the present disclosure.

FIG. 5B is a timing chart of using a registered event. The timing chart 500B includes a publisher micro service 520, an event message streamer 522, and a consumer micro service 524. The timing chart 500B may include more or fewer steps or may arrange the order of the steps differently than those shown in FIG. 5B. The timing chart 500B can be executed as a set of computer-executable instructions executed by a computer system and encoded or stored on a computer readable medium. Further, processing according to the timing chart 500B can be performed by gates or circuits associated with a processor, an ASIC, an FPGA, a SOC or other hardware device. Hereinafter, the timing chart 500B shall be explained with reference to the systems, component, devices, modules, software, data structures, data characteristic representations, signaling diagrams, methods, etc. described in conjunction with FIGS. 1, 2A-B, 3A-B, 4A-B, 5A, 6, 7, 8, and 9.

In aspects, the publisher micro service 520 imports a version of an event definition library of a particular language in use by the publisher micro service 520. The publisher micro service 520 publishes 532 an event to the topic via an event message streaming client.

The consumer micro service 524 imports a version of an event definition library of a language used by the consumer micro service 524. The consumer micro service 524 retrieves the schemas and data type from library. The consumer micro service 524 subscribes 530 to the topic by communicating with the event message streamer 522.

The event message streamer 522 sends the published event to one or more client micro services that subscribe to events of the type. In aspects, the event message streamer 522 sends 534 an event of the event type and the topic to the consumer micro service 524. The consumer micro service 524 consumes the event from the topic.

As should be appreciated, operations 532-534 are described for purposes of illustrating timing of the present method and systems. The operations and are not intended to limit the disclosure to a particular sequence of steps, e.g., steps may be performed in different order, an additional steps may be performed, and disclosed steps may be excluded without departing from the present disclosure.

Figure 6:
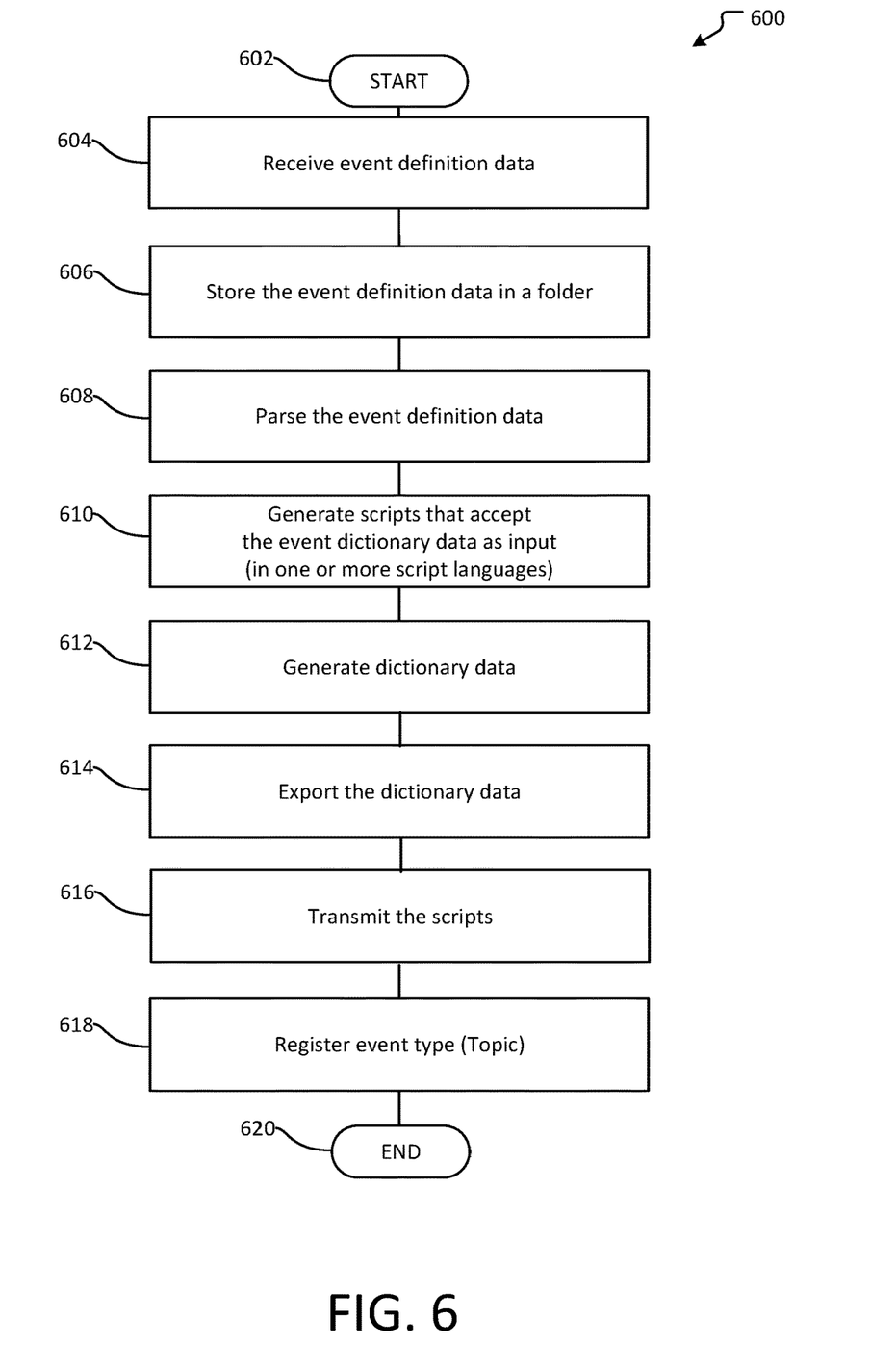
FIG. 6 illustrates an example of a method for registering an event in accordance with aspects of the present disclosure.

FIG. 6 illustrates an example of a method of processing a request registering an event type in accordance with aspects of the present disclosure. A general sequence of operations of the method 600 is shown in FIG. 6. Generally, the method 600 starts with a start operation 602 and ends with an end operation 620. The method 600 may include more or fewer steps or may arrange the order of the steps differently than those shown in FIG. 6. The method 600 can be executed as a set of computer-executable instructions executed by a computer system and encoded or stored on a computer readable medium. Further, the method 600 can be performed by gates or circuits associated with a processor, an ASIC, an FPGA, a SOC or other hardware device. Hereinafter, the method 600 shall be explained with reference to the systems, component, devices, modules, software, data structures, data characteristic representations, signaling diagrams, methods, etc. described in conjunction with FIGS. 1, 2A-B, 3A-B, 4A-B, 5A-B, 7, 8, and 9.

Following the start operation 602, a receive operation 604 receives event definition data (e.g., the definition data 104 as shown in FIG. 1). In aspects, a developer of a micro service may place event definition data in a file at a predefined location of a data storage. In some other aspects, a graphical user interface may enable the developer to interactively entering information associated with defining an event type. In aspects, the receive operation 604 includes reading event definition from the file and detecting new and/or updated event definitions.

A store operation 606 stores the event definition data in a folder. In aspects, the graphical user interface may store the definition data for retrieval by the event type generator (e.g., the event type generator 110 as shown in FIG. 1). In aspects, the folder may be a part of a hierarchical data storage that stores a variety of event definition data of event types.

A parse operation 608 parses the event definition data and generates one or more of parameter-value pairs for registering an event type and data schema for the event type. In aspects, the event definition data is written in an object notation text (e.g., JavaScript Object Notation—JSON). The event definition data may be preformatted for parsing with accuracy.

A generate operation 610 generates one or more scripts for processing events of the event type. For example, the scripts may include descriptions of the event type. The scripts may further include functions to connect, publish, consume, and validate events of the event type. In aspects, the generate operation 610 generates the one or more scripts in a plurality of script languages. The one or more scripts accept the event dictionary data as input. Examples of the script languages may include Python and/or Type Script. In aspects, the generate operation 610 includes generating data types, schemas and scripts for each of the languages supported.

A generate operation 612 generates dictionary data associated with the event type. In aspects, the dictionary data includes data schema as defined in the event definition data.

An export operation 614 exports (e.g., publishes) the dictionary data (e.g., a package in respective languages) to a library repository for one or more micro services that use events of the event type. In aspects, the export operation 614 may store the dictionary data and the scripts in a script library (the event definitions library 120 as shown in FIG. 1). Data in the library repository data are available to micro services for importing.

A transmit operation 616 transmits constructors (e.g., scripts) that accept the event dictionary data as input. The respective micro services may execute the constructor, publish, and/or consume events associated with the event type after the event type is registered in the event message streamer.

A register operation 618 registers the new event type as a topic with configurations associated with the new event type in the event message streamer (e.g., the event message streamer 132 as shown in FIG. 1). The method 600 ends with an end operation 620.

As should be appreciated, operations 602-620 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 7:
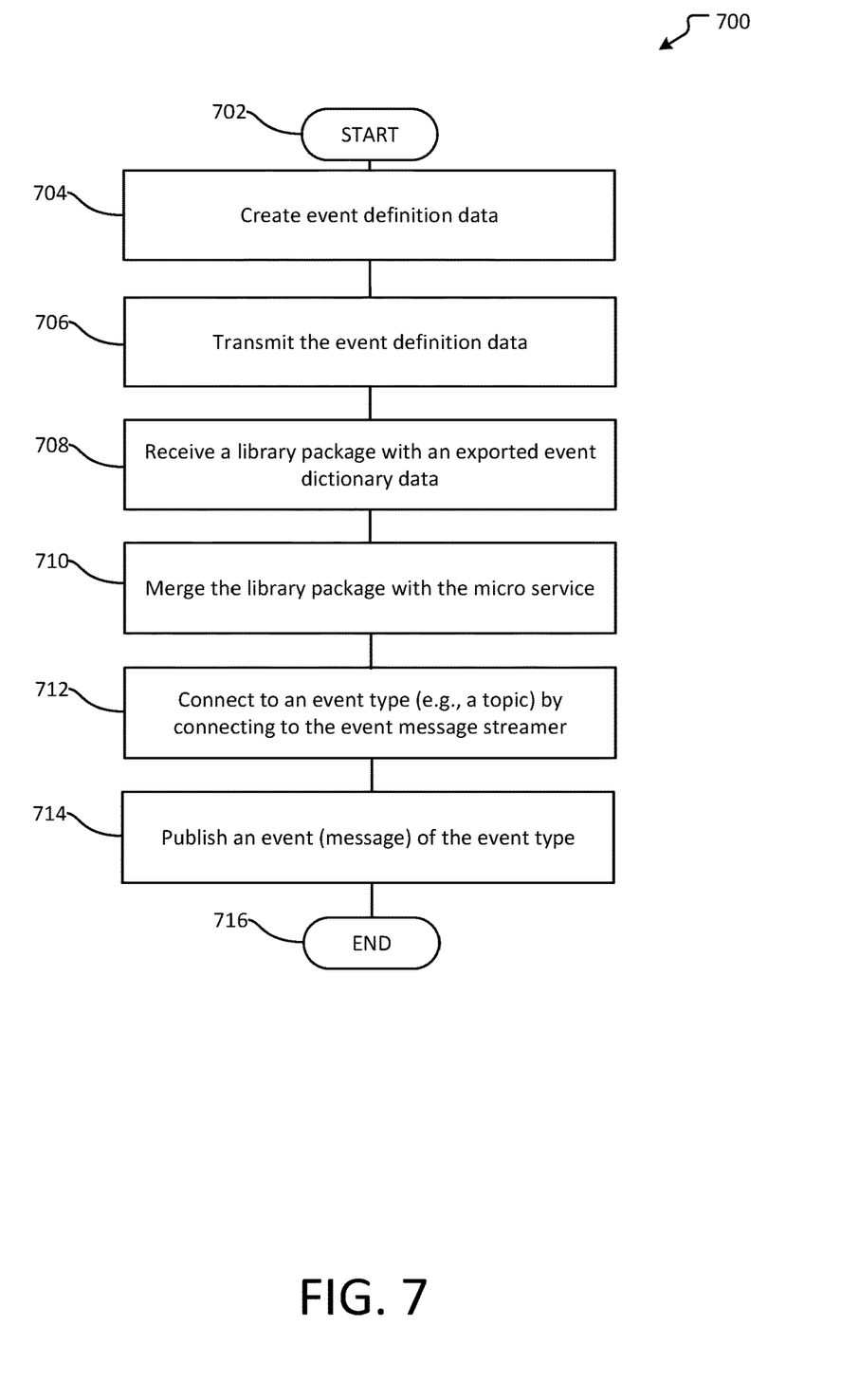
FIG. 7 illustrates an example of a method for publishing an event in accordance with aspects of the present disclosure.

FIG. 7 illustrates an exemplary method for publishing an event of an event type in accordance with aspects of the present disclosure. A general sequence of operations of the method 700 is shown in FIG. 7. Generally, the method 700 starts with a start operation 702 and ends with an end operation 716. The method 700 may include more or fewer steps or may arrange the order of the steps differently than those shown in FIG. 7. The method 700 can be executed as a set of computer-executable instructions executed by a computer system and encoded or stored on a computer readable medium. Further, the method 700 can be performed by gates or circuits associated with a processor, an ASIC, an FPGA, a SOC or other hardware device. Hereinafter, the method 700 shall be explained with reference to the systems, component, devices, modules, software, data structures, data characteristic representations, signaling diagrams, methods, etc. described in conjunction with FIGS. 1, 2A-B, 3A-B, 4A-B, 5A-B, 6, 8, and 9.

Following the start operation 702, a create operation 704 creates event definition data (e.g., the definition data 104 as shown in FIG. 1). In aspects, a developer of a micro service may place event definition data in a file at a predefined location of a data storage. In some other aspects, a graphical user interface may enable the developer to interactively entering information associated with an event type.

A transmit operation 706 transmits the event definition data to the event type generator (e.g., the event type generator 110 as shown in FIG. 1). The event type generator generates scripts and definition data associated with the event type. The event type generator registers the event type in the event message streamer.

A receive operation 708 receives (e.g., imports), by a micro service, an event definition library package from a script library (e.g., the event definitions library 120 as shown in FIG. 1). In aspects, the library package includes event dictionary data associated with the event type. The receive operation 708 further receives scripts, schemas, and data types for processing events of the event type. For example, the scripts include a function to connect to the event message streamer, to publish an event of the event type, to consume an event of the event type, and validate an associated with the event type.

A merge operation 710 merges the library package with the micro service and sets up the event bus client for publishing an event to a topic. In aspects, a pull requestor code may pull (e.g., import) the library package through the receive operation 708 and then merges the library package to a set of instruction codes associated with the micro service. Once merged, the micro service includes instruction codes that use the functions and the definition data associated with the event type.

A connect operation 712 connects, by the micro service, to the event type (e.g., a topic). In aspects, the connect operation 712 includes invoking the connect function and connects with the event message streamer (e.g., the event message streamer 132 as shown in FIG. 1) and enables the micro service to send (e.g., publish) a new event message and/or to receive (e.g., consume) an event message when an event with the event type occurs.

A publish operation 714 publishes an event to a topic. In aspects, the publish operation 714 sets values to parameters associated with the event type and sends the event type and the values to the event message streamer. For example, the event type (e.g., the topic) may be account login. Values for parameters for the exemplary event type of account login based on the event dictionary may include an account ID ("123456"), a role ("ADMIN"), with the current time stamp (as shown in FIG. 4B). The method 700 ends with an end operation 716.

As should be appreciated, operations 702-716 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 8:
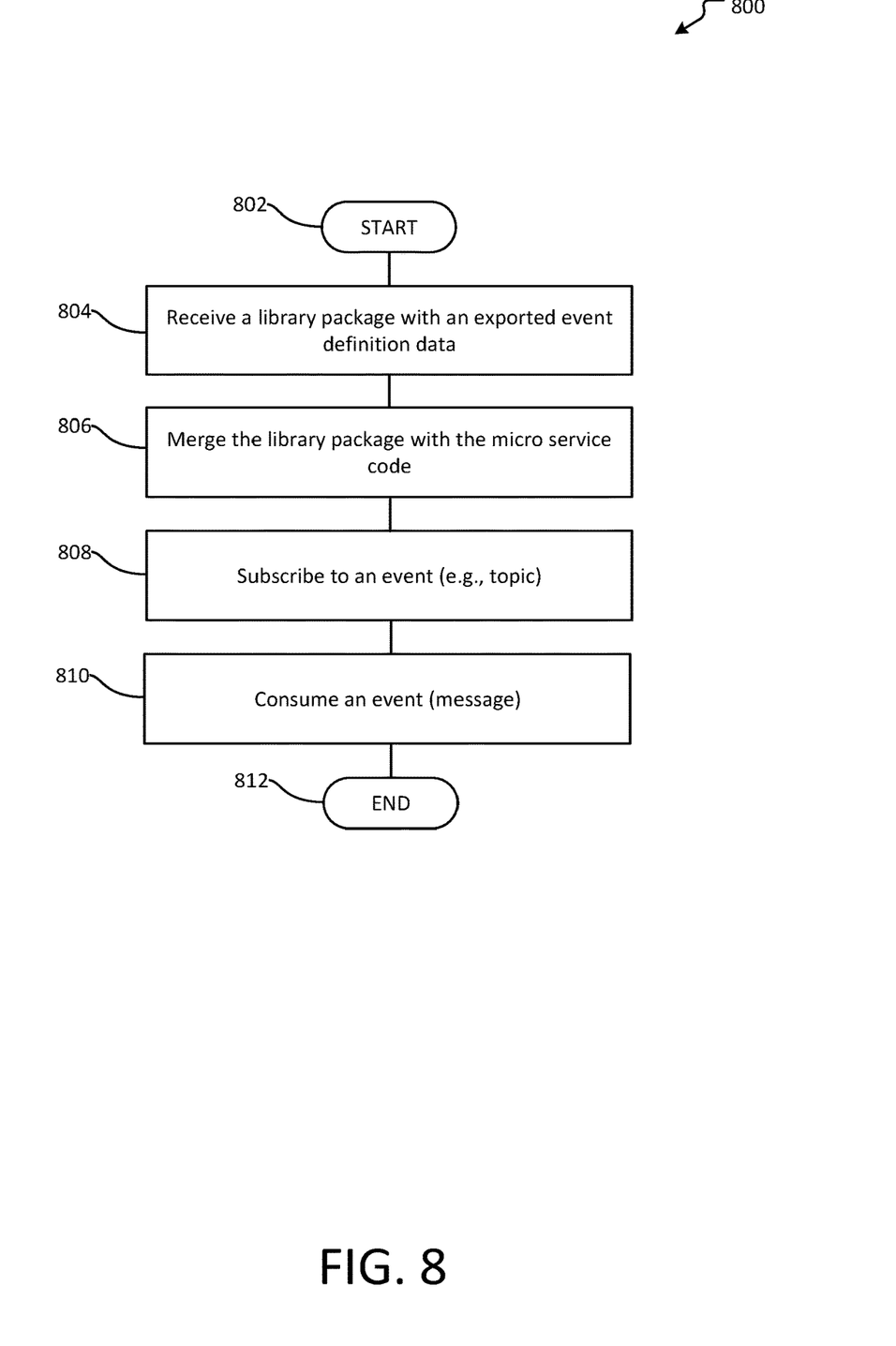
FIG. 8 illustrates an example of a method for consuming an event in accordance with aspects of the present disclosure.

FIG. 8 illustrates an exemplary method for publishing an event of an event type in accordance with aspects of the present disclosure. A general sequence of operations of the method 800 is shown in FIG. 8. Generally, the method 800 starts with a start operation 802 and ends with an end operation 812. The method 800 may include more or fewer steps or may arrange the order of the steps differently than those shown in FIG. 8. The method 800 can be executed as a set of computer-executable instructions executed by a computer system and encoded or stored on a computer readable medium. Further, the method 800 can be performed by gates or circuits associated with a processor, an ASIC, an FPGA, a SOC or other hardware device. Hereinafter, the method 800 shall be explained with reference to the systems, component, devices, modules, software, data structures, data characteristic representations, signaling diagrams, methods, etc. described in conjunction with FIGS. 1, 2A-B, 3A-B, 4A-B, 5A-B, 6, 7, and 9.

Following the start operation 802, a receive operation 804 receives, by a micro service, a library package from a script library (e.g., the event definitions library 120 as shown in FIG. 1). In aspects, the library package includes event dictionary data associated with the event type. The receive operation 804 further receives (e.g., imports) scripts for processing events of desired event type or a topic. For example, the scripts include a function to connect to the event message streamer, to publish an event of the event type, to consume an event of the event type, and validate an associated with the event type. The receive operation 802 may further retrieve schemas and data types associated with the event type (e.g., the topic) from the event definitions library.

A merge operation 806 merges the library package with the micro service and sets up the event message client with the schemas and data types. In aspects, a pull requestor code may pull (e.g., import) the library package through the receive operation 804 and then merges the library package to a set of instruction codes associated with the micro service. Once merged, the micro service includes instruction codes that use the functions and the definition data associated with the event type.

A subscribe operation 808 subscribes, by the micro service, to an event type (e.g., a topic). In aspects, the subscribe operation 808 includes invoking the connect function and connects with the event message streamer (e.g., the event message streamer 132 as shown in FIG. 1) and enables the micro service to at least receive (e.g., consume) an event message when an event with the event type occurs.

A consume operation 810 consumes, by the micro service, an event with the event type (e.g., an event from a topic). In aspects, the consume operation 810 receives an event message from the event message streamer. The consume operation 810 reads from the event message values to parameters associated with the event type. For example, the event type may be account login. Values for parameters for the exemplary event type of account login based on the event dictionary may include an account ID ("123456"), a role ("ADMIN"), with the current time stamp of the event (as shown in FIG. 4B). The method 800 ends with an end operation 812.

As should be appreciated, operations 802-812 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 9:
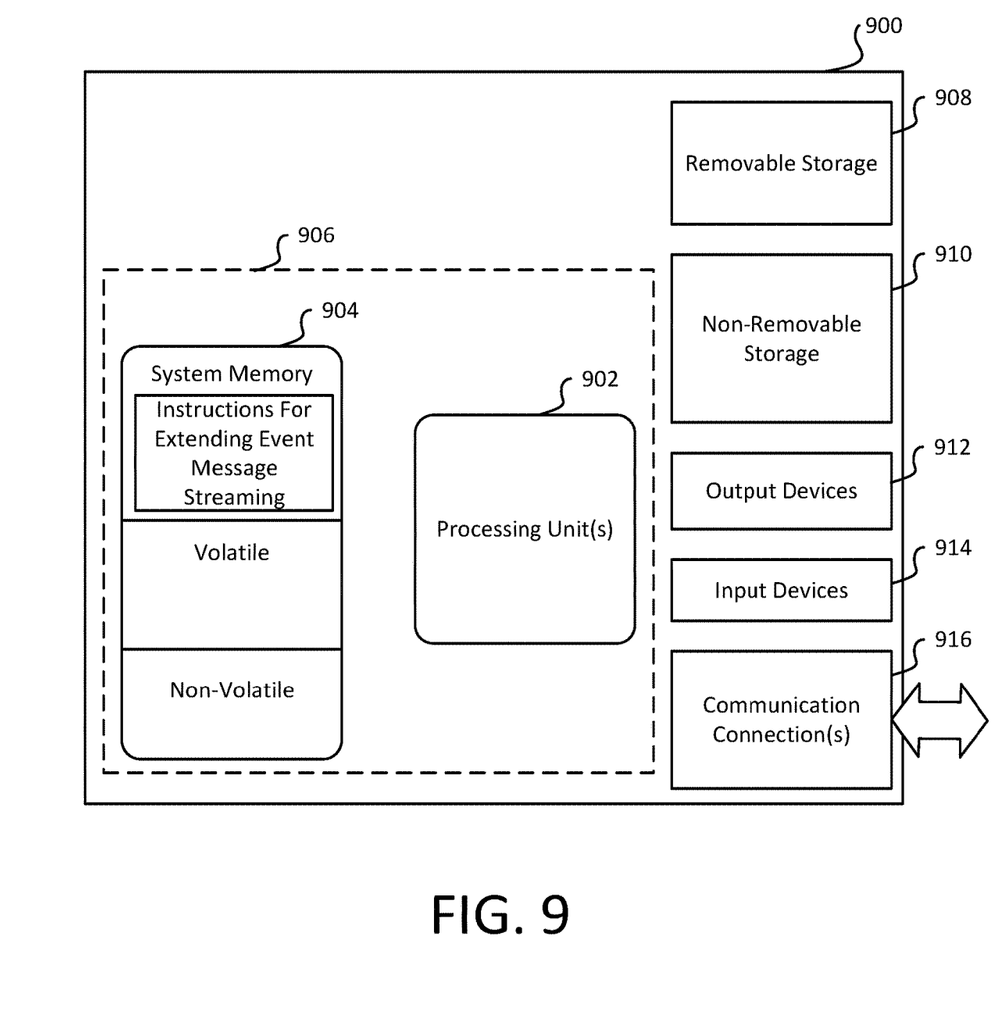
FIG. 9 is a simplified diagram of a computing device with which aspects of the present disclosure may be practiced.

FIG. 9 illustrates a simplified block diagram of a device with which aspects of the present disclosure may be practiced in accordance with aspects of the present disclosure. The device may be a mobile computing device, for example. One or more of the present embodiments may be implemented in an operating environment 900. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smartphones, network PCs, minicomputers, mainframe computers, distributed computing environments that include any of the above systems or devices, and the like.

In its most basic configuration, the operating environment 900 typically includes at least one processing unit 902 and memory 904. Depending on the exact configuration and type of computing device, memory 904 (instructions to perform extending event message streaming as described herein) may be volatile (such as RAM), non-volatile (such as ROM, flash memory, etc.), or some combination of the two. This most basic configuration is illustrated in FIG. 9 by dashed line 906. Further, the operating environment 900 may also include storage devices (removable, 908, and/or non-removable, 910) including, but not limited to, magnetic or optical disks or tape. Similarly, the operating environment 900 may also have input device(s) 914 such as remote controller, keyboard, mouse, pen, voice input, on-board sensors, etc. and/or output device(s) 912 such as a display, speakers, printer, motors, etc. Also included in the environment may be one or more communication connections, 916, such as LAN, WAN, a near-field communications network, a cellular broadband network, point to point, etc.

Operating environment 900 typically includes at least some form of computer readable media. Computer readable media can be any available media that can be accessed by the at least one processing unit 902 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. Computer storage media does not include communication media. Computer storage media does not include a carrier wave or other propagated or modulated data signal.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The operating environment 900 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The present disclosure relates to systems and methods for generating an event type according to at least the examples provided in the sections below. The computer-implemented method comprises receiving, by a server, event definition data associated with the event type; parsing the event definition data; generating, based on the parsed event definition data, a set of scripts for processing events of the event type; generating event dictionary data, wherein the event dictionary data comprises a data schema associated with the event type; exporting the event dictionary data to one or more sets of instruction codes; transmitting constructors to the one or more sets of instruction codes for publishing; and registering the event type in an event message streamer. The set of scripts comprises at least one of connecting, publishing, consuming, and validating the event type. The set of scripts comprises scripts in a plurality of languages, and wherein the plurality of languages comprises Python and TypeScript. The event definition data comprises JavaScript Object Notation. The event definition data comprises JavaScript Object Notation. The event message streamer comprises an event bus. Both the event definition data and the event dictionary data comprises the data schema associated with the event type. The method further comprises storing the received event definition data; and exporting the event dictionary data to the one or more sets of instruction codes, wherein the one or more sets of instruction codes at least publish an event associated with the event type. The one or more sets of instruction codes comprise a micro service, and wherein the micro service executes asynchronously with another micro service. The method further comprises receiving, from a tester including an interactive user interface, a set of values associated with an event of the event type; validating, based on the data schema for the event type, the set of values; and transmitting the validated set of values.

Another aspect of the technology relates to a system for generating an even type. The system comprises a processor; and a memory storing computer-executable instructions that when executed by the processor cause the system to receive, by a server, event definition data associated with the event type; parse the event definition data; generate, based on the parsed event definition data, a set of scripts for processing events of the event type; generate event dictionary data, wherein the event dictionary data comprises a data schema associated with the event type; export the event dictionary data to one or more sets of instruction codes; transmit constructors to the one or more sets of instruction codes; and register the event type in an event message streamer. The set of scripts comprises at least one of connecting, publishing, consuming, and validating the event type. The set of scripts comprises scripts in a plurality of languages, and wherein the plurality of languages comprises Python and TypeScript. The event definition data comprises JavaScript Object Notation. The event message streamer comprises an event bus. Both event definition data and the event dictionary data comprises the data schema associated with the event type. The computer-executable instructions when executed further causing the system to storing the received event definition data; and exporting the event dictionary data to the one or more sets of instruction codes, wherein the one or more sets of instruction codes at least publish an event associated with the event type. The one or more sets of instruction codes comprise a micro service, and wherein the micro service executes asynchronously with another micro service.

In still further aspects, the technology relates to a computer-implemented method for extending event streaming. The method comprises receiving event definition data associated with the topic; generating, based on the event definition data, one or more of a data type, a schema, or a script; generating a set of package data associated with a plurality of script languages, the set of package data includes a package data associated with each script language; storing the set of package data in a library repository for publication; and registering, based on the event definition data, the topic and a configuration in an event message streamer. The script includes at least one of connecting, publishing, consuming, or validating the event type. The plurality of script languages comprises Python and TypeScript. The event definition data comprises JavaScript Object Notation. The event message streamer includes an event bus.

Any of the one or more above aspects in combination with any other of the one or more aspect. Any of the one or more aspects as described herein.

What is claimed is:

1. A computer-implemented method of processing an event having an event type, the method comprising:
   receiving a library package comprising exported event definition data associated with the event type;
   merging the library package with a set of instruction codes for a service;
   registering, based on the library package, for the event type with an event message streamer; and
   processing, using the library package, an event of the event type received from the event message streamer as a result of the registering.

2. The computer-implemented method of claim 1, wherein the library package comprises at least one function of connecting, publishing, consuming, and validating the event type.

3. The computer-implemented method of claim 1, wherein the event message streamer comprises an event bus.

4. The computer-implemented method of claim 1, wherein the library package comprises a data schema associated with the event type.

5. The computer-implemented method of claim 1, wherein the service is a first service that executes asynchronously from a second service.

6. The computer-implemented method of claim 1, wherein the library package comprises a script used to process the event of the event type by the service.

7. The computer-implemented method of claim 1, further comprising transmitting, by the service via the event message streamer, a second event using the library package.

8. A system, comprising:
   a processor; and
   a memory storing computer-executable instructions that when executed by the processor cause the system to:
   receive a library package comprising exported event definitions for an event type;
   merge the library package with a set of instruction codes for a service;
   register, based on the library package, for the event type with an event message streamer; and
   process an event of the event type received from the event message streamer using the library package as a result of registering of the event type with the event message streamer.

9. The system of claim 8, wherein the library package comprises at least one function of connecting, publishing, consuming, and validating the event type.

10. The system of claim 8, wherein the event message streamer comprises an event bus.

11. The system of claim 8 wherein the library package comprises a data schema associated with the event type.

12. The system of claim 8, wherein the service is a first service that executes asynchronously from a second service.

13. The system of claim 8, wherein the library package comprises a script used to process the event of the event type by the service.

14. A computer-implemented method for event streaming for a topic, the method comprising:
   receiving, from a library repository, a library package defining a set of events associated with the topic;
   including the library package as part of a service;
   registering, via the library package, the service as an event recipient from an event message streamer; and
   processing an event of the event type received from the event message streamer via the library package.

15. The computer-implemented method of claim 14, wherein the library package includes at least one function of connecting, publishing, consuming, or validating the topic.

16. The computer-implemented method of claim 14, wherein the event message streamer comprises an event bus.

17. The computer-implemented method of claim 14, wherein the library package comprises a data schema associated with the event type.

18. The computer-implemented method of claim 14, wherein the service is a first service that executes asynchronously from a second service.

19. The computer-implemented method of claim 14, wherein the library package comprises a script used to process the event of the event type by the service.

20. The computer-implemented method of claim 14, further comprising transmitting, by the service via the event message streamer, a second event using the library package.

* * * * *